Nov. 3, 1959
E. C. PROCTER
2,910,880
IDLER MOUNTING
Filed Dec. 12, 1956
Fig. 1
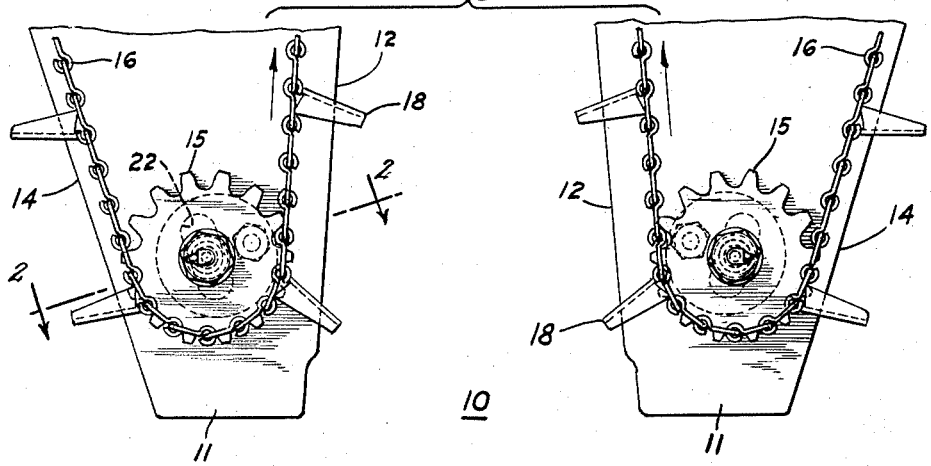
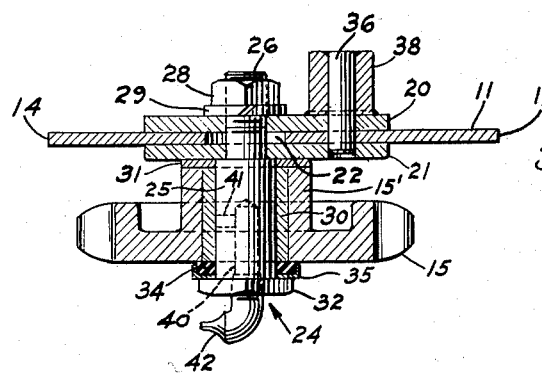
Fig. 2.
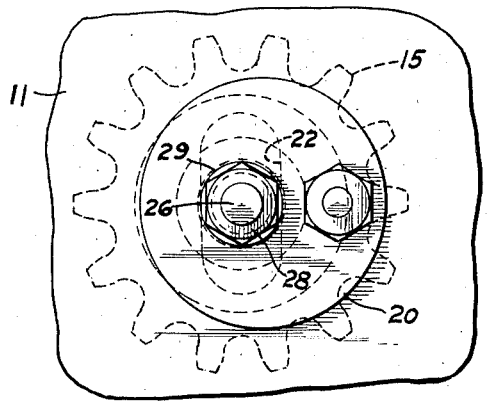
Fig. 3.
INVENTOR
EDWARD C. PROCTER
BY Joseph Allen Brown
ATTORNEY

United States Patent Office 2,910,880
Patented Nov. 3, 1959

2,910,880

IDLER MOUNTING

Edward C. Procter, New Holland, Pa., assignor to Sperry Rand Corporation, New Holland, Pa., a corporation of Delaware Application December 12, 1956, Serial No. 627,887

1 Claim. (Cl. 74—242.15)

The present invention relates generally to agricultural machinery, and more particularly to means for rapidly adjusting a chain idler in a corn picker or row crop harvester.

Heretofore, idlers for the gathering chains of a corn picker have been difficult or at least inconvenient to adjust. Idlers have been mounted, for example, as shown in U.S. Patent No. 2,560,801, dated July 17, 1951, wherein each idler wheel is carried on an angle bracket bolted to a support board (Fig. 12). The bracket has an elongate slot whereby on loosening of the bolts, the bracket may be adjusted relative to the board. Generally, a crow bar or other tool is used to shift the idler after the bolts have been loosened, it being necessary to hold the idler in adjusted position while the bolts are tightened.

Also, it has been practiced heretofore to provide lubrication means on each idler wheel in a corn picker by having a grease fitting on each wheel which leads to a bore extending angularly to the shaft on which the idler is rotatable. This creates a difficulty in that when the idler wheel is to be lubricated, the fitting may be in an inaccessible place, depending on the position the idler may assume when it comes to a stop.

The primary object of this invention is to provide an idler having means whereby it may be adjusted relative to a supporting board more rapidly and more conveniently than was possible with adjustment means heretofore available.

Another object of this invention is to provide an idler and adjusting means of the character described which is of relatively simple construction, thereby rendering manufacture inexpensive.

A further object of this invention is to provide means in an idler structure of the character described whereby the idler may be readily lubricated regardless of the position at which the idler may stop after use.

Other objects of this invention will be apparent hereinafter from the specification and from the recital in the appended claim.

In the drawing:

Fig. 1 is a semi-diagrammatic, fragmentary plan view of the inlet portion of the corn picker showing idlers for the respective gathering chains of the picker mounted according to this invention;

Fig. 2 is a section taken on the line 2—2 of Fig. 1, looking in the direction of the arrows; and Fig. 3 is an enlarged fragmentary plan view of one of the idlers.

Referring now to the drawings by numerals of reference, 10 (Fig. 1) denotes the inlet of a corn picker. Inlet 10 is defined by a pair of support boards or plates 11—11 having converging inner edges 12—12 and diverging outer edges 14—14. Each support board has an idler wheel or sprocket 15 rotatably mounted on it around which is trained an endless chain 16 having outwardly extending crop engageable members 18 which project beyond the edges of the board. Members 18 on the respective chains gather crop material and feed it into the picker.

Each idler 15 is mounted as best shown in Fig. 2. On opposite sides of support board 11 are support plates 20—21 in the form of discs. Plates 20—21 are of identical configuration and overlie an elongate slot 22 in board 11. Mounted on these plates is a spindle 24 having a body 25 of one diameter and a threaded neck 26 of reduced diameter. The end of body 25 adjacent neck 26 abuts against plate 21, the neck 26 extending through bores in both of the plates and having a nut 28 threaded on its outer end. Interposed between nut 28 and plate 20 is a lock washer 29. When nut 28 is tightened, the plates and support board are clamped together between washer 29 and the body 25 of spindle 24.

Surrounding body 25 is a bushing 30 on which idler wheel 15 is rotatably mounted. A thrust washer 31 is interposed between the hub 15' of idler 15 and plate 21. The idler is held in place by a bolt head 32 on spindle 24, there being a felt ring 34 and retainer 35 between head 32 and the idler and bushing 30.

Extending through plate 20, board 11, and into plate 21, at a point spaced from opening 22 and the rotational axis of spindle 24, is a pin 36 about which plates 20—21 are adapted to pivot. The diameter of neck 26 of the spindle is such relative to the size of elongate opening 22 to permit a limited range of pivotal movement of the plates.

To facilitate pivoting of plates 20—21 a tool engageable member 38 is welded to plate 20, member 38 having an axis co-axial with the axis of pin 36. Member 35 may be of any desired form, such as, the hexagonal head illustrated.

From the above description, it will be apparent that each idler 15 may be adjusted to tighten or loosen its associated gathering chain by merely loosening nut 28, then applying a wrench to member 38 to pivot plates 20—21 in a direction which causes a tightening or loosening of the chain 16, as desired. When an appropriate degree of tightness of the chain is reached, the idler is held in adjusted position and nut 28 is tightened. Plates 20—21 and board 11 are clamped between washer 29 and the body 25 of the spindle, thereby locking the plates relative to the board and the idler 15 in desired position.

With applicant's structure, the idlers 15 on the corn picker may be easily and conveniently adjusted to desired position, requiring much less time than was required heretofore with mounting structures of prior design.

An additional feature of applicant's structure is the means provided for lubricating the idler. Conventionally, a grease fitting is carried on the idler, there being a bore extending angularly to the spindle on which the idler is rotatable, as previously stated. However, when the idler comes to rest, the grease fitting may be disposed in an inaccessible or inconvenient place. With applicant's structure, the grease fitting is disposed in the same position all the time, regardless of the position which the idler assumes when it comes to a stop.

As shown in Fig. 2, spindle 24 has an orifice 40 which extends on the axis of the spindle from head 32, there being a right angular outlet leg 41 communicating with the periphery of body 25. A grease fitting 42 is provided for the admission of lubricant. With this structure, the disposition of the grease fitting 42 is not affected by idler 15. All that is necessary is that the fitting be properly positioned when idler 15 is clamped in adjusted position. It will thereafter remain in such position until the idler is next adjusted.

While applicant's invention has been described in connection with tightening the gathering chains of a corn picker, it will be apparent that the structure may be employed in other machines. Further, while the invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention and the limits of the appended claim.

Having thus described my invention, what I claim is:

In a chain tightener, the combination of a support board having an opening therein, a spindle extending perpendicular to said board and having one end projecting through said opening and an opposite free end spaced from the board, an idler sprocket rotatable on said free end, means retaining said sprocket on said spindle, a pair of support plates, one abutting against one side of said support board and the other abutting against an opposite side of the board, said support plates having registered holes through which said one end of said spindle projects, releasable means for connecting said spindle to said plates and for clamping said plates to said board, said releasable means comprising a shoulder on said spindle operable against said other support plate and means threaded on said spindle one end operable against said one support plate, the size of said spindle being smaller than the size of said board opening whereby the spindle may be adjusted laterally in said opening, a pin projecting through said one support plate, said board and into said other support plate to provide a pivotal connection between the plates and the board, said pin projecting outwardly from said one support plate and being spaced radially outwardly from said holes in said plates, and a tool engageable member secured to said one support plate on the axis of said pin whereby when said releaseable means is released and a tool applied to said member said spindle can be swung about said pivotal connection and adjusted relative to said board.

References Cited in the file of this patent

UNITED STATES PATENTS

| | | |
|---|---|---|
| 654,182 | Rupsch | July 24, 1900 |
| 724,417 | Anderson | Apr. 7, 1903 |
| 776,170 | Burkhardt | Nov. 29, 1904 |
| 2,088,148 | Wilson | July 27, 1937 |